United States Patent
Krause

(10) Patent No.: US 8,009,443 B2
(45) Date of Patent: Aug. 30, 2011

(54) DC/DC CONVERTER AND AC/DC CONVERTER

(75) Inventor: Axel Krause, Nesslau (CH)

(73) Assignee: BRUSA Elektronik AG, Sennwald (CH)

( * ) Notice: Subject to any disclaimer, the term of this patent is extended or adjusted under 35 U.S.C. 154(b) by 0 days.

(21) Appl. No.: 12/782,001

(22) Filed: May 18, 2010

(65) Prior Publication Data

US 2010/0220501 A1 Sep. 2, 2010

Related U.S. Application Data

(63) Continuation of application No. PCT/IB2010/050401, filed on Jan. 29, 2010.

(60) Provisional application No. 61/228,141, filed on Jul. 23, 2009, provisional application No. 61/148,377, filed on Jan. 29, 2009.

(30) Foreign Application Priority Data

Jan. 29, 2009 (CH) .......................................... 136/09
Jul. 8, 2009 (CH) ...................................... 1059/09

(51) Int. Cl.
*H02M 3/335* (2006.01)
*H02M 7/48* (2007.01)
*H02M 5/42* (2006.01)
*H02M 7/5387* (2007.01)

(52) U.S. Cl. ................ 363/17; 363/71; 363/98; 363/132

(58) Field of Classification Search .................... 363/17, 363/71, 98, 132

See application file for complete search history.

(56) References Cited

U.S. PATENT DOCUMENTS 3,517,300 A * 6/1970 McMurray ...................... 363/25
(Continued)

FOREIGN PATENT DOCUMENTS

CA 1106915 B 8/1981
(Continued)

OTHER PUBLICATIONS

ISR of Swiss(CH) Patent Office in Priority Application No. CH1059/2009, dated Nov. 3, 2009.

(Continued)

*Primary Examiner* — Adolf Berhane
*Assistant Examiner* — Jue Zhang
(74) *Attorney, Agent, or Firm* — George Kapsalas; Patentbuero Paul Rosenich AG

(57) ABSTRACT

A DC/DC converter (1) having a plurality n of two-pole inverters (2a, 2b) connected in parallel or in series, n transformers ($T_a$, $T_b$) and n two-pole rectifiers (3a, 3b) connected in parallel or in series is described. One inverter (2a, 2b) each and one rectifier (3a, 3b) each are connected to a transformer ($T_a$, $T_b$). The inverters (2a, 2b, 2a', 2b') are in turn connected to a control which is provided for frequency-synchronous actuation of the inverters (2a, 2b, 2a', 2b') with a 180°/n phase shift. According to the invention, leakage inductances ($L_{S1}$, $L_{S2}$) of the transformers ($T_a$, $T_b$, $T_a'$, $T_b'$), together with capacitors ($C_1$, $C_2$) of the inverters (2a, 2b, 2a', 2b') and/or capacitors ($C_3$, $C_4$) of the rectifiers (3a, 3b, 3a', 3b'), form in each case a resonating circuit whose resonant frequency is substantially twice as great as a clock frequency of the control signal. Furthermore, an AC/DC converter (6) is described which has a DC/DC converter (1) according to the invention with an AC/DC stage (5) connected on the input side.

20 Claims, 5 Drawing Sheets

U.S. PATENT DOCUMENTS

| | | | |
|---|---|---|---|
| 4,017,784 A | 4/1977 | Simmons et al. | |
| 4,152,636 A | 5/1979 | Gorden | |
| 4,336,486 A | 6/1982 | Gorden et al. | |
| 4,591,775 A | 5/1986 | Nussel et al. | |
| 4,685,039 A | 8/1987 | Inou et al. | |
| 5,200,887 A | 4/1993 | Ioroi et al. | |
| 5,555,494 A | 9/1996 | Morris | |
| 5,633,577 A | 5/1997 | Matsumae et al. | |
| 5,650,923 A | 7/1997 | Suzuki et al. | |
| 5,754,413 A | 5/1998 | Fraidlin et al. | |
| 5,949,662 A | 9/1999 | Boldin et al. | |
| 5,973,939 A | 10/1999 | Tan | |
| 6,388,904 B2 * | 5/2002 | Nomura | 363/71 |
| 6,490,183 B2 | 12/2002 | Zhang | |
| 6,765,810 B2 | 7/2004 | Perry | |
| 7,149,096 B2 | 12/2006 | Batarseh et al. | |
| 7,187,566 B2 | 3/2007 | Kawashima et al. | |
| 7,498,776 B2 | 3/2009 | Nishimura | |
| 7,593,244 B2 | 9/2009 | Sodo et al. | |
| 7,679,941 B2 * | 3/2010 | Raju et al. | 363/37 |
| 7,746,669 B2 | 6/2010 | Falk | |
| 2002/0126517 A1 * | 9/2002 | Matsukawa et al. | 363/69 |
| 2008/0284386 A1 | 11/2008 | Nishimura | |
| 2008/0316774 A1 | 12/2008 | Ito et al. | |

FOREIGN PATENT DOCUMENTS

| | | |
|---|---|---|
| DE | 1638344 A1 | 9/1969 |
| DE | 1763299 A1 | 10/1971 |
| DE | 2127497 A1 | 12/1972 |
| DE | 2624532 A1 | 12/1977 |
| DE | 2737541 A1 | 2/1978 |
| DE | 4416679 A1 | 12/1994 |
| DE | 19646666 A1 | 6/1997 |
| DE | 10051156 A1 | 5/2002 |
| DE | 10151153 A1 | 4/2003 |
| DE | 102006055126 A1 | 6/2008 |
| EP | 0116925 A2 | 8/1984 |
| EP | 0152719 A1 | 8/1985 |
| EP | 0670236 A1 | 9/1995 |
| EP | 1227571 A2 | 7/2002 |
| EP | 1391982 A2 | 8/2003 |
| EP | 1643626 A2 | 4/2006 |
| EP | 1926205 A1 | 5/2008 |
| EP | 1971016 A2 | 9/2008 |
| JP | 2003111413 A | 4/2003 |
| JP | 2005006455 A | 1/2005 |
| WO | 86/04749 A1 | 8/1986 |
| WO | 93/20614 A1 | 10/1993 |
| WO | 2006125410 A1 | 11/2006 |
| WO | 2010086788 A2 | 8/2010 |
| WO | 2010086823 A2 | 8/2010 |
| WO | 2010086788 A3 | 10/2010 |
| WO | 2010086823 A3 | 10/2010 |
| WO | 2010150139 A1 | 12/2010 |

OTHER PUBLICATIONS

ISR of Swiss(CH) Patent Office in Priority Application No. CH0136/2009, dated Apr. 20, 2009.

PCT International Search Report and Written Opinion from WO2010086823 parent application of the present application; dated Aug. 27, 2010.

PCT International Search Report and Written Opinion from WO2010086788 claiming same Swiss priority application as the present application; dated Aug. 17, 2010.

Pinheiro, J.R. et al. "Isolated Interleaved-Phase-Shift PWM DC-DC ZVS Converters," from IEEE 2000 Industry Applications Conference, Oct. 8-12, 2000, Piscataway NJ, pp. 2383-2388; ISBN: 978-0-7803-6401-1; cited in PCT ISR of parent application.

Steigerwald, R.L. et al. "A Comparison of High Power DC-to-DC Soft-Switched Converter Topologies," from IEEE 1994 Annual Conference of the Industry Applications Society, Oct. 2-6, 1994, Denver, Colorado, pp. 1090-1096; ISBN:978-0-7803-1993-6; cited in PCT ISR of parent application.

* cited by examiner

DC/DC CONVERTER AND AC/DC CONVERTER

This application claims benefit of priority to prior U.S. provisional application No. 61/228,141 filed on Jul. 23, 2009, as a non-provisional thereof; the present application also claims benefit as a continuation of PCT International Application No. PCT/IB2010/050401 filed on Jan. 29, 2010; parent PCT International Application No. PCT/IB2010/050401 claims benefit of priority to Swiss national applications no. CH-01059/09 filed on Jul. 8, 2009, and CH-00136/09 filed on Jan. 29, 2009; parent PCT International Application No. PCT/IB2010/050401 also claims benefit of priority to prior U.S. provisional application No. 61/148,377 filed on Jan. 29 2009, as a non-provisional thereof; all of these prior applications, U.S. 61/228,141, PCT/IB2010/050401, Swiss 01059/09, Swiss 00136/09, and U.S. 61/148,377 are all incorporated herein by reference in their respective entireties, for all intents and purposes, each as if fully set forth identically herein.

BACKGROUND OF THE INVENTION

The invention relates to a DC/DC converter having a plurality of two-pole inverters connected in parallel or in series, just as many transformers and just as many two-pole rectifiers connected in parallel or in series. One inverter is connected to a primary side of one transformer and one rectifier is connected to a secondary side of one transformer. Furthermore, the inverters are connected to a control which is provided for frequency-synchronous actuation of the inverters, with a 180°/n phase shaft, with the aid of a control signal, n indicating the number of transformers. In addition, the invention relates to an AC/DC converter.

A DC/DC converter (also "direct current chopper") converts a constant input voltage by periodic switching so that a different arithmetic mean voltage value is produced at the output. The basic types are step-down converter (output voltage lower than the input voltage), step-up converter (output voltage higher than the input voltage) and inverter (output voltage has a negative sign compared with the input voltage).

An AC/DC converter converts an input AC voltage into an output DC voltage, the DC voltage as a rule differing from the effective value of the AC voltage. AC/DC converters in the form of power units which, for example, permit the supply of electronic devices on an AC voltage network are widely used. In addition, AC/DC converters in the form of rectifiers are encountered.

DE 100 51 156 A1, which describes a converter circuit for medium-frequency transformational energy transmission by means of a transformer connected on the primary side and secondary side to power electronic rectifiers, is mentioned as a further example of a converter. At least two rectifiers controllable independently of one another and connected to in each case a partial winding of a single-core transformer are synchronized alternately, whereby they produce either bipolar voltage pulses in succession or monopolar voltage pulses of opposite polarity alternately, in order to increase, for example, the power density of the transformer.

EP 1 227 571 A2 furthermore discloses a DC/DC converter having converter parts, transformers and rectifier parts. Two sets of converter parts comprise two pairs of first switching elements and two further pairs of second switching elements, which are connected in a full bridge configuration. Series capacitors are arranged between the converter parts and the transformers. The switching points of the first switching elements are phase-shifted by a ⅓ n period relative to the switching points of the second switching elements. The switching points of the switching elements of the converter parts on the other hand are phase-shifted by ½ n periods relative to one another.

Finally, EP 1 391 982 A2 discloses a circuit comprising a pair of converter circuit parts for converting a supply voltage of a DC voltage source into an AC voltage. This is effected by two pairs of switching elements in full bridge configuration, which are arranged parallel to the DC voltage source and rectifier part and are led via transformers to the outputs of each converter circuit part. Series capacitors are arranged as a smoothing unit between the converter circuit parts and the transformers. The secondary sides of the transformers of a rectifier part of each of these smoothing units are connected in series in N groups of smoothing units. Furthermore, the secondary sides of the other rectifier parts are also connected in series in the N groups of smoothing units.

DC/DC converters are to be found in almost all areas of industry, for example in the automotive industry, if the on-board voltage of typically 12 volt is to be converted into a different DC voltage, in battery-operated devices, if the battery or accumulator voltage is not the same as the voltage required by the electronic circuit, or in electrical drive technology.

Not least, DC/DC converters are also used in combination with an AC/DC stage, an AC voltage (in Europe typically 230 V AC) being converted into an intermediate circuit voltage (DC voltage) and this intermediate circuit voltage, which often cannot be generated as high or as low as desired, then being brought to a desired level by a DC/DC converter.

An important field of use of AC/DC converters is, inter alia, also the charging of batteries or accumulators at the power supply, which is becoming increasingly important owing to the continuously increasing mobility of people and the associated operation of mobile electrical and electronic devices. Not least, electrically driven motor vehicles also set completely new requirements with regard to battery chargers, since on the one hand the charging should be possible both at the single-phase power supply (customary in the household), owing to the greater power density and hence faster charging, but on the other hand also at the three-phase power supply. Associated therewith are differences in the mains voltage (in Europe 230 V AC in the single-phase power supply and 400 V AC in the three-phase power supply) which—because in fact the battery voltage is constant—must be taken into account in the circuit technology. Furthermore, a comparatively high energy content (which in the end determines the range of the vehicle) should be transferred in as short a time as possible from the power supply to the battery.

The power of the DC/DC converters and/or AC/DC converters, which in some cases is considerable, unfortunately often leads in the case of a conventional design to comparatively high power ripples on the load (e.g. battery). However, the feedbacks to the supply side, i.e. for example into the supplying power network, can also be problematic. Such feedbacks may occur, for example, in the case of transient processes which are due, for example, to switching processes or nonlinear consumers, in particular to components of the power electronics, such as, for example, transistors and thyristors.

It is an object of the invention to provide a DC/DC converter and/or AC/DC converter in which power ripples on a load connected to the converter and/or supply-side feedbacks are reduced.

Accordingly, a DC/DC converter according to the invention and of the type mentioned at the outset additionally comprises the feature that leakage inductances of the transformers, with capacitors of the inverters and/or capacitors of the rectifiers, form in each case a resonating circuit whose resonant frequency is substantially twice as large as a clock frequency of the control signal.

Accordingly, an AC/DC converter according to the invention comprises a DC/DC converter according to the invention which has an AC/DC stage on the supply side.

By means of this circuit—as will be shown later—power ripples on the load and/or supply-side feedbacks (e.g. mains feedbacks) are effectively reduced. The converters according to the invention are therefore suitable in particular for the purposes mentioned at the outset, but their use is by no means limited to these areas. Owing to the reduced mains feedbacks, in particular very powerful battery chargers (e.g. for electric vehicles) can thus be realized, in which power ripples on the load are at least reduced—if not avoided—and the specifications of the power supply companies with regard to the maximum mains feedbacks are fulfilled.

According to the invention, sinusoidal AC voltages which are superposed on a DC voltage and are phase-shifted by 180° result at the capacitors. This has the advantage that the switching of the rectifier or inverter takes place at the crossover of the current, which practically eliminates the switching losses and reduces the electromagnetic disturbances to a minimum. In the case of series connection of the inverters or rectifiers, the phase-shifted AC voltages compensate one another, resulting in a practically ripple-free DC voltage. The term "substantially" is defined in this context by that level of an AC voltage superposed on the DC voltage which is tolerable in terms of engineering. If the leakage inductance of the transformers is too small, it can of course be increased to the desired value by an additional coil in series with the primary and secondary winding.

For resonance, the parallel connection of the leakage inductance and main inductance of the transformers is decisive. Since the main inductance is however about 100 times greater than the leakage inductance in most applications, the main inductance acting in parallel with the leakage inductance is generally negligible in practice. If, however, the actual ratios differ decisively from those described above, it may, however, also be appropriate to take into account the main inductance.

Furthermore, it should be pointed out that a "converter" in the context of the disclosure may be understood as meaning a rectifier, an inverter or a bidirectional converter. A "rectifying element" may be understood, for example, as meaning a diode, a transistor (e.g. an MOSFET or an IGBT), a thyristor or another rectifying element. Furthermore a "switching element" may be understood, for example, as meaning a transistor (e.g. once again an MOSFET or an IGBT), a thyristor or another switching element. Accordingly, there are passive rectifiers, active rectifiers or active inverters. Finally, "batteries" are to be understood as meaning chargeable batteries, accumulators or other power-storing media.

Advantageous configurations, versions, and further developments of the invention shall be understood from the following description and drawings.

It is advantageous if the DC/DC converter has two inverters, two transformers and two rectifiers, since this gives a comparatively simple design.

It is also advantageous if the transformers have separate cores since in this way mutual influencing thereof can be more or less ruled out.

It is advantageous if one capacitor each is connected in parallel to one inverter each and/or one capacitor each is connected in parallel to one rectifier each. In this way, power ripples and/or feedbacks to the supply side can be particularly readily reduced since the already comparatively smooth DC voltage is further smoothed.

It is furthermore advantageous if a common capacitor is connected in parallel to the inverters and/or a common capacitor is connected in parallel to the rectifiers. This variant of the invention, too, ensures a particularly good reduction of power ripples and/or feedbacks to the supply side, but the number of capacitors is reduced in this variant. The circuit is therefore technically simpler as a whole.

It is advantageous if one rectifying element is connected antiparallel to one switching element each of an inverter and one switching element is connected antiparallel to one rectifying element each of a rectifier. The DC/DC converter can then convert electrical energy not only in one direction but also in the opposite direction and in principle therefore permits bidirectional operation. Suitable switching elements are, for example, components from power electronics, in particular transistors or thyristors. The abovementioned converters, i.e. passive rectifiers, active rectifiers or active inverters, can therefore also be used in any desired combination, i.e. for example a passive rectifier combined with an active inverter.

It is also advantageous if the control signal is a square-wave signal. This signal can easily be generated and is therefore particularly suitable for the DC/DC converter according to the invention. A symmetrical square-wave signal, i.e. a square-wave signal with 50% pulse duty factor, is particularly advantageous. The use of other signal shapes, for example delta or sine shapes, is, however, not ruled out thereby.

It is furthermore advantageous if the inverters and/or the rectifiers are connected in parallel or can be connected in parallel and coils are arranged between the inverters and/or the rectifiers. In this way, in spite of the parallel connection, the resonating circuits described above are enabled to oscillate in phase opposition with their resonant frequency, so that, with retention of the mode of operation described above, the direct currents sum but the ripple currents subtract at the common connection of the two coils. In this way, a compensation of the voltage ripple can be achieved even when the inverters and/or the rectifiers are connected in each case in parallel on both sides of the transformers.

In the case of the parallel connection mentioned, it is advantageous if the coils are coupled. In this way, the size of the coils can be substantially reduced. The two coupled coils may furthermore be considered as a transformer or may be a part thereof. If a transformer is provided, then advantageously only one component is required for compensating the voltage ripple, instead of two components. Furthermore, the use of the transformer gives rise to energy advantages compared with separate coils. In a further advantageous configuration of the invention, an autotransformer is provided for this purpose.

Finally, it is advantageous if the AC/DC converter is provided for bidirectional operation by a combination of a rectifier with an antiparallel inverter and vice versa (in this case also in the AC/DC stage). This can optimally be used, for example, in the solar power sector in that, in the case of sunlight and an excess of direct current, electric power firstly can be stored in batteries but secondly can also be delivered to the alternating current mains. If darkness then coincides with a demand for alternating current, firstly alternating current can be taken from the mains (if the mains is capable of delivering) and secondly current from the batteries can be converted into alternating current and hence serve the installation as an AC voltage source. Furthermore, an electric vehicle (not used for travelling) with its battery can accordingly be operated as a power buffer for an alternating current mains.

It should be made clear here that the invention relates not only to converters for battery chargers but to converters generally. Moreover, the battery chargers relate not simply to applications in motor vehicle construction or in solar technology but generally to battery chargers. The person skilled in the art will easily establish here the suitability of the invention also for other fields of use.

The above configurations and further developments of the invention can be combined in any desired manner.

BRIEF DESCRIPTION OF THE DRAWINGS

The present invention is illustrated in more detail below with reference to the working examples shown in the schematic figures of the drawing.

DETAILED DESCRIPTION

Figure 1:
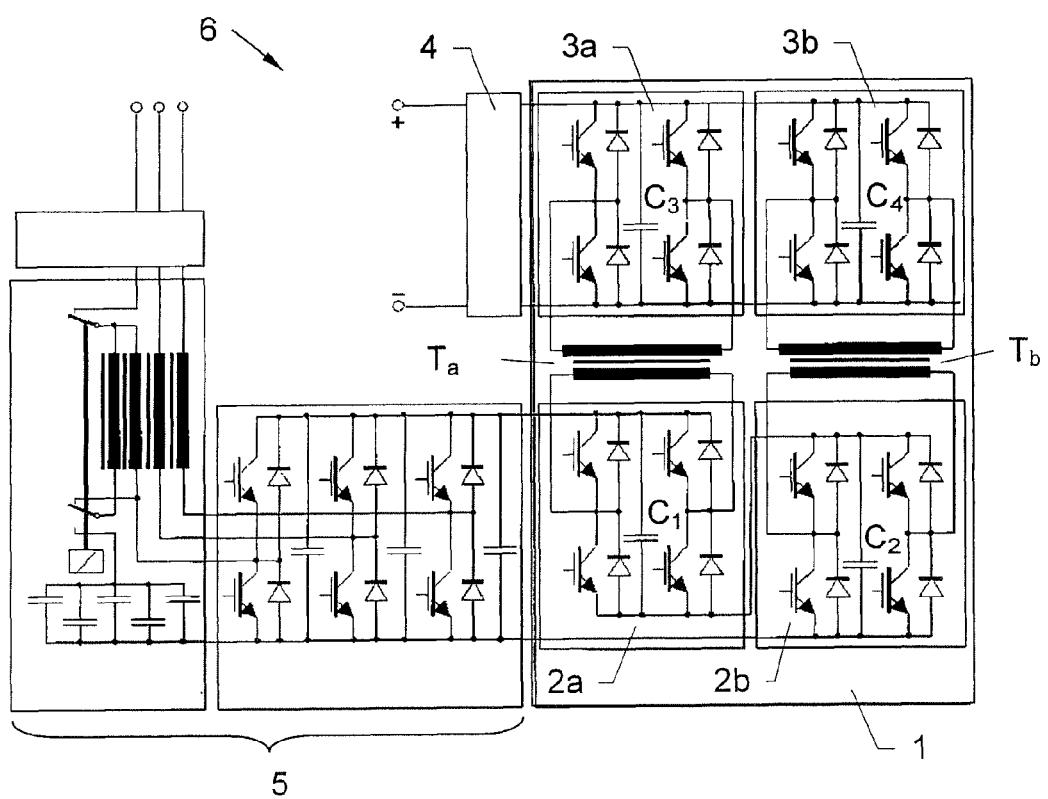
FIG. 1 schematically shows a DC/DC converter according to the invention.

In the figures of the drawing, identical and similar parts are provided with identical reference numerals, and elements and features having a similar function are provided—unless stated otherwise—with identical reference numerals but different indices.

FIG. 1 shows a DC/DC converter 1 having two two-pole inverters 2a, 2b connected in series, with one capacitor $C_1$, $C_2$ each connected parallel thereto. The inverters 2a, 2b in turn are connected to one primary side each of two transformers $T_a$, $T_b$ (in this case with separate cores). One secondary side each of the transformers $T_a$, $T_b$ is connected to one two-pole rectifier 3a, 3b each and to one capacitor $C_3$, $C_4$ each connected parallel thereto. The rectifiers 3a, 3b in turn are connected in parallel and are provided via a filter 4 for connection of a load. The capacitors $C_1 \ldots C_4$ shown in FIG. 1 are advantageous but by no means essential. Furthermore, instead of the capacitors $C_3$ and $C_4$, one capacitor can be provided for both rectifiers 3a, 3b. The filter 4, too, may be considered optional.

In the drawing, the inverters 2a, 2b are connected in series on the primary side but the rectifiers 3a, 3b are connected in parallel. However, all 4 combinations of series and parallel connection are conceivable, i.e. for example two parallel inverters 2a, 2b and two parallel rectifiers 3a, 3b. If the inverters 2a, 2b, too, are connected in parallel, one capacitor can be provided for both inverters 2a, 2b instead of the capacitors $C_1$ and $C_2$.

The DC/DC converter 1 is moreover provided for bidirectional operation, i.e. can set the output voltage on the load side or, in the case of inverse operation, the intermediate circuit voltage to any desired level. For this purpose, in each case an inverter 2a, 2b is equipped with an antiparallel rectifier stage and in each case a rectifier 3a, 3b is equipped with an antiparallel inverter stage. Although this is advantageous for the operation of the DC/DC converter, it is by no means essential.

In FIG. 1, the DC/DC converter 1 is connected on the supply side to an AC/DC stage 5 and, together with this, forms an AC/DC converter 6. The AC/DC converter 6 can be used, for example, for the power supply of direct current-operated devices on the mains. These include all types of electronic devices or direct current machines. Finally, the AC/DC converter 6 can be used for charging batteries, in particular a battery of an electric automobile. The AC/DC stage 5 is to be regarded as being optional for the invention.

The AC/DC stage 5 is of a particular design in that three coils coupled in the same sense are connected to a converter on the supply side or mains side, one of the coils being formed by two partial coils. A switch (two-pole relay) connects the partial coils so that they are connected in parallel in the case of a three-phase mains connection and in series in the case of single-phase operation, the "remaining" connection at the three-phase converter in the case of single-phase operation being connected to the base of the converter via the partial coils connected in series and a capacitor. In this example, the capacitor is formed from five parallel partial capacitors.

Finally, it should be noted that, although only two transformers $T_a$ and $T_b$ with converters connected thereto are shown in FIG. 1, the inventive concept can also be extended to include a plurality of transformers $T_a$ and $T_b$ with converters connected thereto.

The function of the DC/DC converter shown in FIG. 1 will now be explained with reference to FIG. 2, which shows a simplified diagram of this circuit. In order to present in principle also the bidirectional mode of operation which is possible with the DC/DC converter shown, the energy flow in FIG. 2 takes place from a battery (connected to the filter 4 and not shown in FIG. 1) to the alternating current mains.

Figure 2:
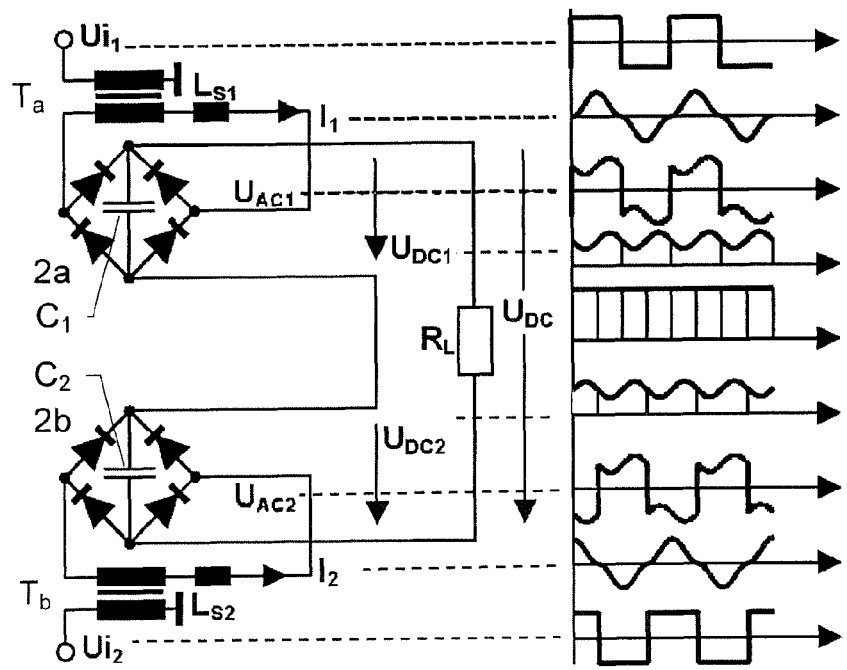
FIG. 2 shows a simplified diagram of the DC/DC converter together with the time variation of different voltages and currents.

FIG. 2 shows the two transformers $T_a$ and $T_b$ and the voltages $U_{i1}$ and $U_{i2}$ which are delivered from the inverter stages on the battery side (referred to below with 3a and 3b like the rectifiers on the battery side) to the transformers $T_a$ and $T_b$. Furthermore, FIG. 2 shows the rectifier stages on the load side and mains side, respectively (referred to below as 2a and 2b like the inverters on the mains side), which are connected on the secondary side to the transformers $T_a$ and $T_b$ and here are in the form of simple full-bridge rectifiers with the smoothing capacitors $C_1$ and $C_2$. In addition, the time variations of the voltages $U_{i1}$ and $U_{i2}$ from the inverter stages 3a and 3b on the battery side, the currents $I_1$ and $I_2$ through, and the voltages $U_{AC1}$ and $U_{AC2}$ at, the secondary windings of the transformers $T_a$ and $T_b$, the rectified voltages $U_{DC1}$ and $U_{DC2}$ and their total voltage $U_{DC}$ are shown.

The two inverter stages 2a, 2b are frequency-synchronous but operated with symmetrical square-wave voltage with 90° offset. If more than two transformers $T_a$ and $T_b$ with converters connected thereto are used, then the phase shift should be appropriately adapted. Accordingly, it is particularly advantageous if n transformers are actuated with signals which are in each case phase-shifted by 180°/n relative to one another.

The leakage inductances $L_{S1}$, $L_{S2}$ of the transformers $T_a$ and $T_b$, together with the capacitors $C_1$ and $C_2$, in each case form a resonating circuit. If its resonant frequency is precisely twice as great as the clock frequency, sinusoidal AC voltages which are superposed on the DC voltage and are phase-shifted by 180° result at $C_1$ and $C_2$. These phase-shifted AC voltages compensate one another through the series connection of the inverters 2a, 2b, resulting in a practically ripple-free DC voltage on the load side.

In addition, the resonant operation ensures that the transistors of the inverter stage 2a and 2b (MOSFETs in the example shown) are switched on and off virtually without current, which reduces losses and substantially avoids HF interference. Owing to the moderate rate of change of current in the transformer windings, parasitic loss effects (eddy currents, skin and proximity effects or the like) are likewise reduced.

In the example shown, it is assumed that the battery voltage is lower than the mains or intermediate circuit voltage. With this precondition, there are some advantages of the circuit shown. Because the resonance capacitors $C_1$ and $C_2$ are arranged on the side of higher voltage (i.e. in this case the mains side), they exhibit a lower loss and have a higher energy density. Furthermore, the series connection of the two converters on the high voltage side permits the use of switches (diodes in the specific case here) with smaller losses.

Finally, it should be noted that the AC/DC stage 5 shown in FIG. 1 is advantageous but by no means essential for the invention. Of course, other AC/DC stages which in principle are capable of providing an (optionally ripple-containing) DC voltage are also suitable. Furthermore, it is noted that, if the AC/DC converter 6 is designed for bidirectional operation, as shown in FIG. 1, the AC/DC converter 6 can of course also be used as a DC/AC converter in all technical fields suitable for this group of devices.

Figure 3:
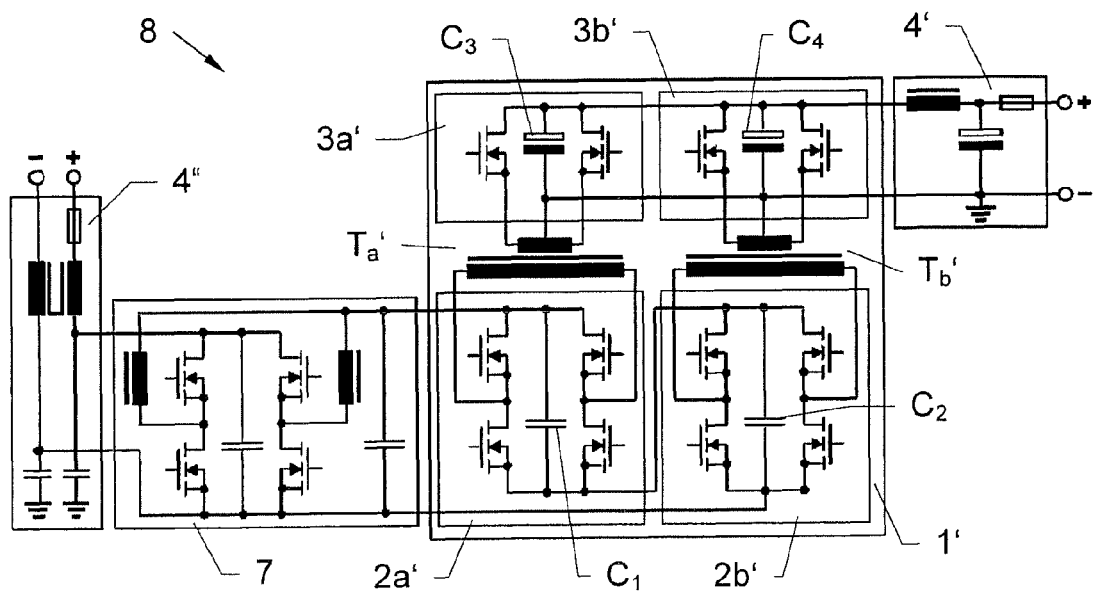
FIG. 3 schematically shows a further variant of a DC/DC converter according to the invention.

FIG. 3 shows a further variant of the invention with a DC/DC converter 1' which comprises two two-pole inverters 2a', 2b' connected in series and each having a capacitor $C_1$, $C_2$ connected parallel thereto. The inverters 2a', 2b' are in turn connected to one primary side each of two transformers $T_a'$, $T_b'$ (here once again with separate cores). One secondary side of the transformers $T_a'$, $T_b'$ is connected to one rectifier 3a', 3b' each, which each consist of two switches connected in parallel and one capacitor $C_3$, $C_4$ connected parallel thereto. The secondary windings of the transformers $T_a'$, $T_b'$ are shown divided in this example so that the rectifiers 3a', 3b' are operated with a center tap connection. This means that the switches of the rectifiers 3a', 3b' are connected to the ends of the secondary winding, and the capacitors $C_3$, $C_4$ are connected to the center tap of the transformers $T_a'$, $T_b'$. The rectifiers 3a', 3b' are in turn connected in parallel and provided via a filter 4' (in this case a low-voltage filter) for connection of a load.

FIG. 3 schematically shows the division ratio between primary coils and secondary coils of the transformers $T_a'$, $T_b'$ by different lengths thereof. In the example shown, the ratio of a partial coil of the secondary winding to the primary winding of the transformers $T_a'$, $T_b'$ is 1:6 and hence the ratio of secondary winding to the primary winding is 2:6 or 1:3. This is of course to be regarded merely by way of example. Naturally, other winding ratios are also possible.

Instead of an AC/DC stage, a DC/DC stage 7 is moreover provided in this example, which DC/DC stage is in this variant in the form of a bidirectional step-up/step-down converter. In this way, a constant output voltage can be produced over a wide range of the DC input voltage. Of course, other designs are also conceivable. Finally, a filter 4" (in this case a high-voltage filter) is arranged on the mains side. The circuit shown in FIG. 3 thus forms a DC/DC converter arrangement 8.

Figure 4:
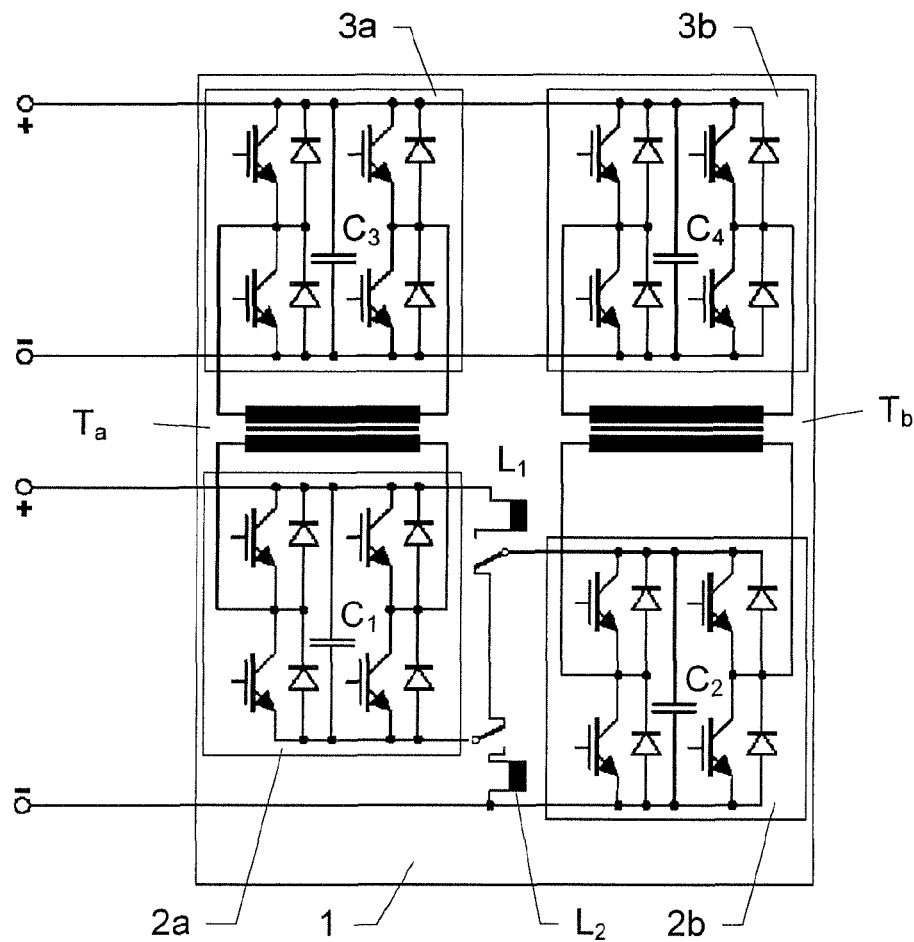
FIG. 4 shows a DC/DC converter in which the inverters can be connected in parallel.

The manner in which an AC voltage superposed on the DC voltage in the case of series connection of the rectifiers 2a, 2b at a load $R_L$ can be eliminated, i.e. a virtually ripple-free DC voltage can be achieved on the load side, was shown in FIG. 2. FIG. 4 now shows a solution in which the inverters 2a, 2b can be connected not only in series but also in parallel with the aid of a change-over switch. In the case of parallel connection, coils $L_1$ and $L_2$ are connected between the two inverters 2a and 2b so that a system capable of oscillating forms. The direct current component can pass unhindered through the coils $L_1$ and $L_2$, the alternating current components oscillate with opposite timing and therefore cancel out overall. Otherwise, the circuit shown in FIG. 4 corresponds to the DC/DC converter 1 already illustrated in FIG. 1 and will therefore not be described in more detail here.

In principle, the coils $L_1$ and $L_2$ are required only when both the converters 2a and 2b as well as 3a and 3b are connected in parallel. If the converters 2a, 2b, 3a, 3b are connected in series on one side of the transformers $T_a$ and $T_b$, the coils $L_1$ and $L_2$ can be dispensed with. The following picture therefore results: without the aid of coils $L_1$ and $L_2$, the converters 2a, 2b, 3a, 3b can be connected on both sides of the transformers $T_a$ and $T_b$ in series/in series, in series/parallel or parallel/in series. With the coils $L_1$ and $L_2$, parallel/parallel connection can also be effected, so that, here too, the advantages of the ripple compensation and of switching in current crossover result.

Figure 5:
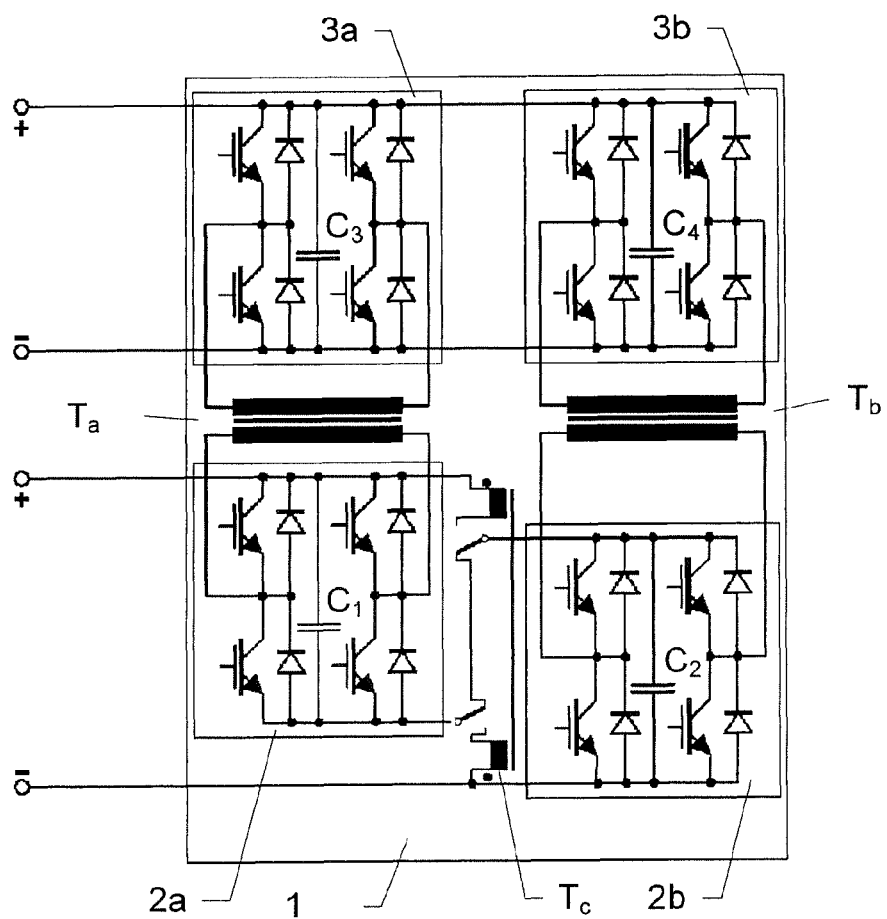
FIG. 5 shows the DC/DC converter from FIG. 4 but with coupled coils.

FIG. 5 now shows a further variant of the circuit shown in FIG. 4. The coils $L_1$ and $L_2$ are coupled. In this way, the size of the coils $L_1$ and $L_2$ can be substantially reduced. Their function is, however, otherwise similar to the coils $L_1$ and $L_2$ used in FIG.4. The two coupled coils $L_1$ and $L_2$ may furthermore be considered as transformer $T_c$ (which however does not serve for electrical isolation here). If a transformer $T_c$ is provided, then advantageously only one component is required for compensating the voltage ripple. Furthermore, the use of the transformer $T_c$ results as a rule in smaller losses compared with separate coils $L_1$ and $L_2$.

Figure 6:
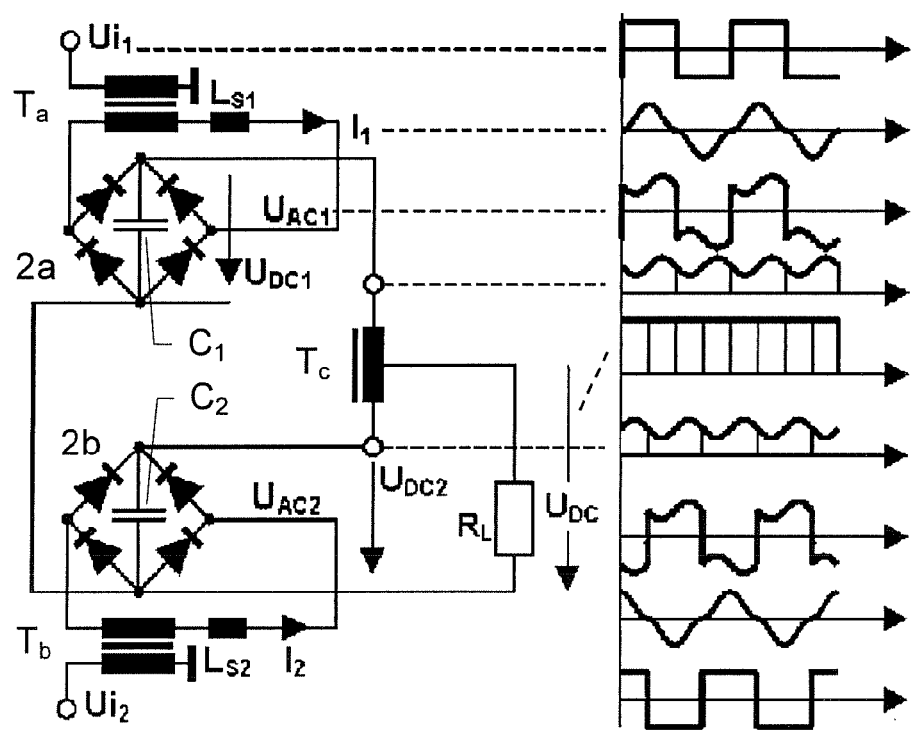
FIG. 6 shows a further variant of a DC/DC converter with inverters connected in parallel, together with the time variation of different voltages and currents.

FIG. 6 shows—similarly to FIG. 2 which shows the voltage curves for inverters 2a and 2b connected in series—the voltage curves for inverters 2a and 2b connected in parallel. In this variant, an autotransformer $T_c$ is connected between the two inverters 2a and 2b, via the center tap of which the load resistance $R_L$ is connected. Instead of the autotransformer $T_c$, two coils can also be provided as an equivalent.

The principle shown can of course also be extended to include more than two inverters 2a and 2b connected in parallel. An appropriate number of coils or transformers with an appropriate number of windings should be provided for this purpose. In the case of three inverters connected in parallel, for example, a transformer having three coils in a star connection should therefore be provided in FIG. 6, the load $R_L$ being connected at the neutral point. Of course, this principle can also be extended to include any desired number n of inverters connected in parallel. The transformer discussed then has n windings in the star connection.

Finally, it should be noted that the variants shown represent only a section of the many possibilities for a DC/DC converter according to the invention and may not be used for limiting the range of use of the invention. It should be straightforward for the person skilled in the art to adapt the invention to his needs on the basis of the considerations described here, without departing from the scope of protection of the invention. Accordingly, the techniques and structures described and illustrated herein should be understood to be illustrative only and not limiting upon the scope of the present invention. The scope of the present invention is defined by the appended claims, including known equivalents and unforeseeable equivalents at the time of filing of this application.

LIST OF REFERENCE NUMERALS 1, 1' DC/DC converter
2a, 2b, 2a', 2b' Inverter
3a, 3b, 3a', 3b' Rectifier
4, 4', 4" Filter
5 AC/DC stage
6 AC/DC converter
7 DC/DC stage 8 DC/DC converter arrangement
$C_1, C_2, C_3, C_4$ Capacitor
$L_{S1}, L_{S2}$ Leakage inductances
$L_1, L_2$ Coils
$R_L$ Load resistance
$T_a, T_b, T_a', T_b', T_c$ Transformer
$U_{AC1}, U_{AC2}$ AC voltages
$U_{DC}, U_{DC1}, U_{DC2}$ DC voltages

What is claimed is:

1. A DC-to-DC converter comprising:
a first two-pole inverter;
a second two-pole inverter connected to said first inverter;
a first transformer, said first transformer having a first transformer primary side connected to said first inverter, and said first transformer having a first transformer secondary side;
a second transformer, said second transformer having a second transformer primary side connected to said second inverter, and said second transformer having a second transformer secondary side;
a first two-pole rectifier connected to said second transformer primary side;
a second two-pole rectifier connected to said second transformer secondary side, said second rectifier connected to said first rectifier;
a first capacitor connected in parallel to said first two-pole inverter;
a second capacitor connected in parallel to said second two-pole inverter;
a third capacitor connected in parallel to said first rectifier; and,
a control configured to provide a control signal for frequency-synchronous actuation with a ninety-degree phase shift of said first and second two-pole inverters, so that leakage inductances of said first and second transformers together with said capacitors form resonating circuits having resonant frequency substantially twice as great as a clock frequency of said control signal.

2. The DC-to-DC converter as claimed in claim 1 wherein:
said second two-pole inverter is connected to said first inverter in series.

3. The DC-to-DC converter as claimed in claim 2 wherein:
said second two-pole rectifier is connected to said first rectifier in parallel.

4. A DC-to-DC converter as claimed in claim 1 further comprising:
a fourth capacitor connected in parallel to said second rectifier.

5. A DC-to-DC converter as claimed in claim 4 further comprising:
said third capacitor is connected to a center tap of said first transformer; and,
said fourth capacitor is connected to a center tap of said second transformer.

6. The DC-to-DC converter as claimed in claim 1 wherein:
said control signal is a square-wave signal.

7. A DC-to-DC converter as claimed in claim 1 further comprising:
said first transformer and said second transformer have separated cores.

8. A DC-to-DC converter as claimed in claim 1 further comprising:
a first switching element in said first two-pole inverter;
a first rectifying element connected antiparallel to said first switching element;
a second switching element in said second two-pole inverter;
a second rectifying element connected antiparallel to said second switching element;
a third rectifying element in said first two-pole rectifier;
a third switching element connected antiparallel to said third rectifying element;
a fourth rectifying element in said second two-pole rectifier; and,
a fourth switching element connected antiparallel to said fourth rectifying element.

9. The DC-to-DC converter as claimed in claim 1 wherein:
said third capacitor is also connected in parallel to said second rectifier.

10. A DC-to-DC converter as claimed in claim 1 further comprising:
a change-over switch configured to selectively connect said first and second two-pole inverters in either a series configuration or a parallel configuration;
a first coil;
a second coil; and,
said first and second coils connected between said first and second two-pole inverters when said change-over switch connects in the parallel configuration.

11. The DC-to-DC converter as claimed in claim 10 wherein:
said first and second coils are coupled.

12. A DC-to-DC converter comprising:
a plurality of two-pole inverters, said plurality corresponding to an integer n, said plurality of two-pole inverters being mutually interconnected in one of either a series configuration or a parallel configuration;
a plurality n of two-pole rectifiers, said plurality of two-pole rectifiers being mutually interconnected in one of either a series configuration or a parallel configuration;
a plurality of respective transformers, each transformer having one respective primary side connected to a respective one of said plurality of two-pole inverters, each transformer having one respective secondary side connected to a respective one of said plurality of two-pole rectifiers;
at least one capacitor connected in parallel with at least one of said plurality of two-pole inverters; and,
a control configured to provide a control signal for frequency-synchronous actuation with a 180°/n phase shift of said plurality of two-pole inverters, so that leakage inductances of said plurality of transformers together with said at least one capacitor form a resonating circuit having resonant frequency substantially twice as great as a clock frequency of said control signal.

13. A DC-to-DC converter as claimed in claim 12 further comprising:
a first plurality of capacitors, each respectively connected in parallel with a respective one of said plurality of two-pole inverters.

14. A DC-to-DC converter as claimed in claim 13 further comprising:
a second plurality of capacitors, each respectively connected in parallel with a respective one of said plurality of two-pole rectifiers.

15. A DC-to-DC converter as claimed in claim 12 further comprising:
at least one capacitor connected in parallel with at least one of said plurality of two-pole rectifiers.

16. A DC-to-DC converter as claimed in claim 12 further comprising:
said plurality of inverters have, each respectively, one inverter switching element, and one inverter rectifying element connected in antiparallel to the respective inverter switching element; and, said plurality of rectifiers have, each respectively, one rectifier rectifying element, and one rectifier switching element connected in antiparallel to the respective rectifier rectifying element.

17. A DC-to-DC converter comprising:

a plurality of two-pole inverters, said plurality corresponding to an integer n, said plurality of two-pole inverters being mutually interconnected in one of either a series configuration or a parallel configuration;

a plurality n of two-pole rectifiers, said plurality of two-pole rectifiers being mutually interconnected in one of either a series configuration or a parallel configuration;

a plurality of respective transformers, each transformer having one respective primary side connected to a respective one of said plurality of two-pole inverters, each transformer having one respective secondary side connected to a respective one of said plurality of two-pole rectifiers;

at least one capacitor connected in parallel with at least one of said plurality of two-pole rectifiers; and, a control configured to provide a control signal for frequency-synchronous actuation with a 180°/n phase shift of said plurality of two-pole inverters, so that leakage inductances of said plurality of transformers together with said at least one capacitor form a resonating circuit having resonant frequency substantially twice as great as a clock frequency of said control signal.

18. A DC-to-DC converter as claimed in claim 17 further comprising:

a first plurality of capacitors, each respectively connected in parallel with a respective one of said plurality of two-pole rectifiers.

19. A DC-to-DC converter as claimed in claim 18 further comprising:

a second plurality of capacitors, each respectively connected in parallel with a respective one of said plurality of two-pole inverters.

20. A DC-to-DC converter as claimed in claim 17 further comprising:

at least one capacitor connected in parallel with at least one of said plurality of two-pole inverters.

* * * * *